United States Patent Office 3,315,346
Patented Apr. 25, 1967

3,315,346
CRIMPING TOOLS, DIE PARTS AND THE LIKE AND METHODS FOR MAKING THE SAME
Frederick Russell Duffield, 355 Pacific Highway, Artarmon, New South Wales, Australia
Filed Jan. 21, 1965, Ser. No. 426,819
Claims priority, application Australia, May 22, 1964, 44,825/64
11 Claims. (Cl. 29—434)

This invention is concerned with improvements in crimping tools and like mechanisms in which a plurality of members are brought together around another member or around a space. Examples are the crimping presses which squeeze nozzles or other fittings on to pressure hoses or any other hollow body on to a separate core, or die presses, moulding dies, or work piece holders and the like in which a plurality of members are brought together to form a die recess, a molding recess or clamp, usually or circular cross-section, although not necessarily so.

In some constructions the various movable crimping tools, die parts or the like (hereinafter referred to as "fingers" for convenience of reference) are mounted on slides travelling upon machined slideways or are provided with machined dowels protruding axially from one face which mate with machined recesses on the contiguous face of the next finger, or such dowels are provided upon parts associated with each finger.

It is an object of the present invention to provide a simple means for holding the various fingers in their correct relative mutual positions when the crimping press or the like is closed, which means besides being reliable shall be more economical to produce than various previously known arrangements, and also shall have less in the way of protruding parts which may be broken off or damaged.

The invention comprises a crimping press, die press or analogous mechanism in which a plurality of fingers are brought together to grip an article or define a central cavity, in which said fingers have projections and recesses upon mutually adjacent faces which, when the fingers are brought together, interengage and so hold the said fingers against displacement towards or from the centre of the article or cavity.

In a preferred embodiment the invention comprises a crimping press, die press or analogous mechanism in which a plurality of fingers are brought together to grip an article or define a central cavity in which said fingers have dowel pins set into the meeting faces of mutually adjacent fingers, such pins each extending with its axis parallel to a meeting face of one of the fingers but slightly within the said meeting face and the said pin being secured in and movable with one of said fingers.

A method for producing crimping tools, dies or analogous mechanisms in accordance with the present invention comprises assembling crimping or like fingers in their correct mutual position and then drilling a hole from one end into each interface, said hole lying partly within each of the mutually adjacent fingers, the axis of the drill being parallel to such interface but slightly more within one finger than the other so that the hole produced is slightly more than a semi-circle in one finger and slightly less than a semi-circle in the other.

Thereafter a steel dowel pin is inserted longitudinally into the recess which is slightly more than a semi-circle and readily retained therein, requiring only some restraint against longitudinal movement by tack welding, brazing, soldering or like operations or minor deformation of part of the finger or dowel. Or it may be a shrink fit in the recess in question.

Thus the dowel instead of projecting lengthwise from the meeting face of one of the fingers lies longitudinally therein but has an arc (usually about a third of its total circumference) which engages in the part circular recess in the other finger.

Besides the simplicity of this arrangement it has the further advantages that stresses are spread throughout the length of the fingers and that some transverse movement of the fingers while the press is closing can take place. Moreover thermal expansion and contraction can be accommodated without straining the dowels.

Apart from this preferred construction, however, it is possible to employ any type of tongued and grooved or similar interengagement between mutually adjacent fingers.

The closing of the fingers together may be effected in any known manner, including the use of slides or collet chucks whereon the fingers are mounted, or of wedge action responsive to hydraulic or other pressure. Such crimping process may be power or manually operated as desired.

Further features of the invention and the manner of application thereof will be apparent from the following description of the accompanying explanatory drawings, by way of exemplification.

Figure 1:
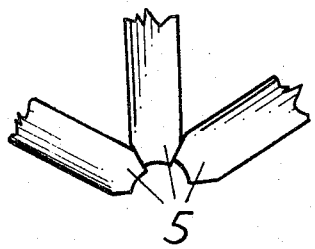
FIGURE 1 is a diagrammatic view showing the difficulty that may be experienced with previously known finger arrangements.

FIGURE 1 of the accompanying drawings shows diagrammatically three mutually adjacent fingers of a six-finger type crimping press in their operative positions, but displaced to a visually exaggerated extent to show the effect of wear or misalignment on the fingers, indicated at 5, and it is to be understood that means not shown (such as key ways) control their movements and ensure that such movements are in a radial sense towards the central cavity defined between their ends; nevertheless as illustrated these fingers can define a cavity which is by no means circular because the extent of radial movement effect may vary from one finger to the next.

It has always been imagined that it is this radial alignment which has to be preserved because of the readily visible radial movements of the fingers towards and away from the centre of the central cavity. It has not been appreciated hitherto, however, that the actual movements of the meeting faces between the mutually adjacent fingers is not radial to the cavity, but circumferential thereto. In other words, the direction of movement of the faces of two mutually adjacent fingers as they come together is substantially normal to the planes of such faces, not parallel thereto.

Figure 2:
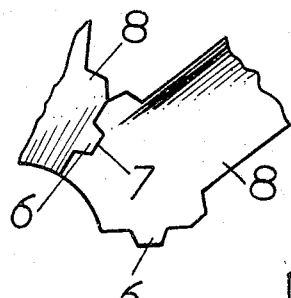
FIGURE 2 is a fractional elevation showing the end of one finger and part of a mutually adjacent finger having a tongued and grooved mutual inter-engagement, being one embodiment of the present invention.

FIGURE 2 shows the advantages achieved according to the present invention by providing a tongued and grooved inter-engagement 6, 7 between mutually adjacent pairs of fingers 8.

In FIGURE 2 the tongues 6 are shown as slightly wedge shaped, and the grooves or recesses 7 have similarly relieved walls, which makes for smoothness of engagement between the tongues and grooves but is not absolutely essential.

Tongues and grooves of square-cut section, or of rounded, V-shaped, or other convenient section may be emloyed as desired. Nor need such tongues and grooves extend throughout the thickness of the fingers, although it is most convenient from the machining point of view that they should do so.

Figure 3:
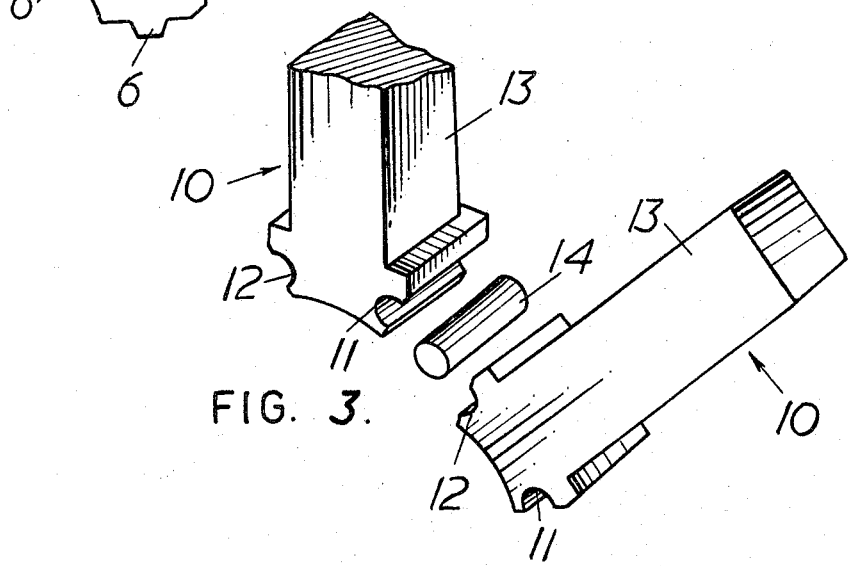
FIGURE 3 is an exploded view to show parts of two mutually adjacent fingers and a dowel between them constituting parts of a further embodiment of the invention.
Figure 4:
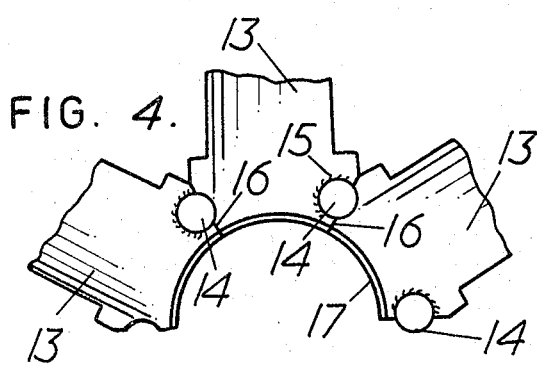
FIGURE 4 shows three of the fingers of FIGURE 3 assembled together in their operative positions.

In FIGURE 3 two fingers 10 for use in a crimping press are shown and it will be seen that near the inner ends of such fingers each is provided with a part cylindrical recess 11 or 12 on each side, one such recess 11 being of rather more than a semi-circle in cross-section and the other, 12 of rather less than a semi-circle, the two recesses when the fingers come together (as shown in FIGURE 4) forming a recess of fully circular cross-section.

Each finger 10 also has a shank portion 13 which is slidably mounted in a suitable holder (not shown) forming part of a crimping press. There is just sufficient play to let the fingers adjust their mutual positions as the dowels and recesses hereinafter mentioned inter-engage.

In each recess 11 is a dowel pin 14 which is secured against longitudinal movement by tack welding 15 at each of its ends. Such dowel pin 14 will enter and fill the part-circular recess 12 in the adjacent finger 10 when the fingers come together on closing of the press (as shown in FIGURE 4).

To make the recess 11, 12 one assembles all the fingers 10 (six of them, in this instance) in the positions they will occupy when the press is closed, which are the positions depicted in FIGURE 4, and clamps them in such positions. Then into each interface 16 between mutually adjacent fingers 10 one drills a hole having its axis parallel to the said interface and normal to the back and front faces of the fingers 10, but slightly inside one of the fingers.

Preferably one then inserts the dowel pins 14 and machines the back and front faces of the fingers and their central work-engaging face 17 before unclamping the fingers. Later the dowel pins 14 are hardened, replaced in the correct recesses 11 and tack welded in position therein.

What is claimed is:

1. A mechanism selected from the group of mechanisms consisting of crimping presses, die presses and analogous mechanisms in which a plurality of fingers are brought together to grip an article or define a central cavity, the said mechanism comprising a plurality of fingers in which the said fingers are formed with tongues and grooves upon mutually adjacent faces which extend across such faces in a direction transverse to the movement of said fingers and are so disposed as to interengage when the fingers are brought together and then to hold the said fingers against displacement towards or from the centre of the article or cavity.

2. A mechanism selected from the group of mechanisms consisting of crimping presses, die presses and analogous mechanisms in which a plurality of fingers are brought together to grip an article or define a central cavity, the said mechanism comprising a plurality of fingers having dowel pins set into the meeting faces of mutually adjacent fingers, each said pin extending with its axis parallel to a meeting plane between two mutually adjacent fingers but slightly within one of the meeting faces of the latter and the said pin being secured in and movable with the said one of said fingers.

3. A mechanism as claimed in claim 2, in which the dowel pins are secured in the recesses by tack welding.

4. A mechanism as claimed in claim 2, in which the dowel pins are secured in the recesses by brazing.

5. A mechanism as claimed in claim 2, in which the dowel pins are secured in the recesses by soldering.

6. A mechanism as claimed in claim 2, in which the dowel pins are secured in the recesses by mechanical deformation of at least one of the fingers and the dowel pin.

7. A mechanism as claimed in claim 2, in which the dowel pins are secured in the recesses by being a shrink fit therein.

8. A mechanism as claimed in claim 2 in which about one-third of the circumference of each dowel pin protrudes from the recess in which such pin is secured.

9. A method for producing a mechanism selected from the group of mechanisms consisting of crimping presses, die presses and analogous mechanisms comprising assembling crimping or like fingers in their correct mutual positions and then drilling a hole from one end into each interface between mutually adjacent fingers, said hole lying partly within each of the said mutually adjacent fingers, the axis of the drill being parallel to such interface but slightly more within one finger than the other, so that the hole produced is slightly more than a semi-circle in one finger and slightly less than a semi-circle in the other, thereafter inserting a dowel pin longitudinally into the said hole and securing it in the recess which is slightly more than a semi-circle.

10. A method for producing a mechanism as claimed in claim 9 in which the fingers are machined after insertion of the dowel pins but before the latter are secured finally in the said fingers.

11. A method for producing a mechanism as claimed in claim 10 in which the dowel pins are removed and hardened after machining but before final securing in said fingers.

References Cited by the Examiner
UNITED STATES PATENTS 1,818,435   8/1931   Smith et al. _____ 72—402
2,807,875  10/1957   Snyder _____ 29—423

JOHN F. CAMPBELL, Primary Examiner.

THOMAS H. EAGER, Examiner.